United States Patent
Archer et al.

(10) Patent No.: US 7,831,866 B2
(45) Date of Patent: Nov. 9, 2010

(54) LINK FAILURE DETECTION IN A PARALLEL COMPUTER

(75) Inventors: Charles J. Archer, Rochester, MN (US); Michael A. Blocksome, Rochester, MN (US); Mark G. Megerian, Rochester, MN (US); Brian E. Smith, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 642 days.

(21) Appl. No.: 11/832,940

(22) Filed: Aug. 2, 2007

(65) Prior Publication Data

US 2009/0037773 A1    Feb. 5, 2009

(51) Int. Cl.
    *G06F 11/00* (2006.01)
(52) U.S. Cl. .................. 714/43; 370/406; 370/241
(58) Field of Classification Search .................. None
    See application file for complete search history.

(56) References Cited

U.S. PATENT DOCUMENTS

| | | | |
|---|---|---|---|
| 4,245,344 A | 1/1981 | Richter | |
| 4,634,110 A | 1/1987 | Julich et al. | |
| 4,860,201 A | 8/1989 | Stolfo et al. | |
| 5,333,268 A | 7/1994 | Douglas et al. | |
| 5,918,005 A | 6/1999 | Moreno et al. | |
| 5,941,992 A | 8/1999 | Croslin et al. | |
| 5,953,347 A | 9/1999 | Wong et al. | |
| 5,953,530 A | 9/1999 | Rishi et al. | |
| 6,047,122 A | 4/2000 | Spiller | |
| 6,449,667 B1 | 9/2002 | Ganmukhi et al. | |
| 6,813,240 B1 | 11/2004 | Shah | |
| 6,848,062 B1 * | 1/2005 | Desai et al. | 714/4 |
| 6,880,100 B2 | 4/2005 | Mora et al. | |
| 6,892,329 B2 * | 5/2005 | Bruckman | 714/43 |
| 6,912,196 B1 | 6/2005 | Mahalingaiah | |
| 7,007,189 B2 * | 2/2006 | Lee et al. | 714/4 |
| 7,028,225 B2 | 4/2006 | Maso et al. | |
| 7,080,156 B2 * | 7/2006 | Lee et al. | 709/238 |
| 7,149,920 B2 * | 12/2006 | Blumrich et al. | 714/4 |

(Continued)

OTHER PUBLICATIONS

N R Adiga et al., "An Overview of the BlueGene/L Supercomputer," Supercomputing, ACM/IEEE 2002 Conference, Nov. 16-22, 2002, Piscataway, NJ.

(Continued)

*Primary Examiner*—Christopher S McCarthy
(74) *Attorney, Agent, or Firm*—Biggers & Ohanian, LLP; James R. Nock

(57) ABSTRACT

Methods, apparatus, and products are disclosed for link failure detection in a parallel computer including compute nodes connected in a rectangular mesh network, each pair of adjacent compute nodes in the rectangular mesh network connected together using a pair of links, that includes: assigning each compute node to either a first group or a second group such that adjacent compute nodes in the rectangular mesh network are assigned to different groups; sending, by each of the compute nodes assigned to the first group, a first test message to each adjacent compute node assigned to the second group; determining, by each of the compute nodes assigned to the second group, whether the first test message was received from each adjacent compute node assigned to the first group; and notifying a user, by each of the compute nodes assigned to the second group, whether the first test message was received.

18 Claims, 8 Drawing Sheets

U.S. PATENT DOCUMENTS

| | | | |
|---|---|---|---|
| 7,200,118 | B2 | 4/2007 | Bender et al. |
| 7,210,088 | B2 | 4/2007 | Chen et al. |
| 7,289,428 | B2 * | 10/2007 | Chow et al. ................. 370/216 |
| 7,382,734 | B2 * | 6/2008 | Wakumoto et al. .......... 370/248 |
| 7,451,340 | B2 * | 11/2008 | Doshi et al. .................... 714/4 |
| 7,461,236 | B1 * | 12/2008 | Wentzlaff .................... 712/10 |
| 7,506,197 | B2 * | 3/2009 | Archer et al. .................. 714/4 |
| 7,529,963 | B2 * | 5/2009 | Archer et al. .................. 714/4 |
| 7,571,345 | B2 * | 8/2009 | Archer et al. .................. 714/4 |
| 7,600,095 | B2 * | 10/2009 | Archer et al. ................. 712/28 |
| 7,646,721 | B2 | 1/2010 | Archer et al. |
| 7,669,075 | B2 * | 2/2010 | Archer et al. .................. 714/4 |
| 2002/0152432 | A1 | 10/2002 | Fleming |
| 2002/0188930 | A1 | 12/2002 | Moser et al. |
| 2003/0061265 | A1 | 3/2003 | Maso et al. |
| 2004/0078493 | A1 | 4/2004 | Blumrich et al. |
| 2004/0103218 | A1 | 5/2004 | Blumrich et al. |
| 2004/0181707 | A1 | 9/2004 | Fujibayashi |
| 2004/0205237 | A1 * | 10/2004 | Doshi et al. ................. 709/241 |
| 2004/0223463 | A1 | 11/2004 | MacKiewich et al. |
| 2005/0120273 | A1 | 6/2005 | Hudson et al. |
| 2005/0131865 | A1 | 6/2005 | Jones et al. |
| 2005/0246569 | A1 | 11/2005 | Ballew et al. |
| 2005/0259587 | A1 * | 11/2005 | Wakumoto et al. .......... 370/248 |
| 2006/0179269 | A1 | 8/2006 | Archer et al. |
| 2007/0174558 | A1 | 7/2007 | Jia et al. |
| 2007/0245122 | A1 * | 10/2007 | Archer et al. ................. 712/17 |
| 2008/0253386 | A1 * | 10/2008 | Barum ....................... 370/406 |
| 2008/0263320 | A1 * | 10/2008 | Archer et al. ................. 712/30 |
| 2008/0263329 | A1 * | 10/2008 | Archer et al. ............... 712/213 |
| 2008/0263387 | A1 * | 10/2008 | Darrington et al. ............. 714/4 |
| 2008/0270998 | A1 | 10/2008 | Zambrana |
| 2008/0313506 | A1 * | 12/2008 | Archer et al. ................. 714/48 |
| 2009/0016332 | A1 * | 1/2009 | Aoki et al. ................... 370/388 |

OTHER PUBLICATIONS

Office Action Dated Nov. 12, 2008 in U.S. Appl. No. 11/279,573.
Office Action Dated Apr. 15, 2009 in U.S. Appl. No. 11/279,573.
Office Action Dated Nov. 12, 2008 in U.S. Appl. No. 11/279,579.
Office Action Dated Apr. 15, 2009 in U.S. Appl. No. 11/279,579.
Office Action Dated Jan. 9, 2009 in U.S. Appl. No. 11/279,586.
Office Action Dated Nov. 18, 2008 in U.S. Appl. No. 11/279,592.
Office Action Dated Apr. 29, 2009 in U.S. Appl. No. 11/279,592.
U.S. Appl. No. 11/279,573, filed Oct. 18, 2007, Archer, et al.
U.S. Appl. No. 11/360,346, filed Oct. 4, 2007, Gooding, et al.
U.S. Appl. No. 11/279,579, filed Nov. 8, 2007, Archer, et al.
U.S. Appl. No. 11/279,586, filed Oct. 18, 2007, Archer, et al.
U.S. Appl. No. 11/279,592, filed Oct. 18, 2007, Archer.
U.S. Appl. No. 11/737,229, filed Oct. 23, 2008, Archer, et al.
U.S. Appl. No. 11/832,940, filed Feb. 5, 2009, Archer, et al.
Final Office Action Dated Oct. 28, 2009 in U.S. Appl. No. 11/279,573.
Final Office Action Dated Sep. 4, 2009 in U.S. Appl. No. 11/279,579.
Notice of Allowance Dated Nov. 2, 2009 in U.S. Appl. No. 11/279,592.
Office Action Dated Mar. 8, 2010 in U.S. Appl. No. 11/360,346.
Notice of Allowance Dated Jun. 30, 2009 in U.S. Appl. No. 11/279,586.
Office Action Dated Mar. 29, 2010 in U.S. Appl. No. 11/832,940.
Stallman, Richard M. GDB Manual—The GNU Source-Level Debugger. [online] (Oct. 1989). Free Software Foundation, Inc., pp. 1-78. Retrieved From the Internet <http://www.cs.cmu.edu/afs/cs/usr/bovik/OldFiles/vax_u13/omega/usr/mach/doc/gdb.ps>.

* cited by examiner

LINK FAILURE DETECTION IN A PARALLEL COMPUTER

STATEMENT REGARDING FEDERALLY SPONSORED RESEARCH OR DEVELOPMENT

This invention was made with Government support under Contract No. B554331 awarded by the Department of Energy. The Government has certain rights in this invention.

BACKGROUND OF THE INVENTION

1. Field of the Invention

The field of the invention is data processing, or, more specifically, methods, apparatus, and products for link failure detection in a parallel computer.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

Parallel computing is an area of computer technology that has experienced advances. Parallel computing is the simultaneous execution of the same task (split up and specially adapted) on multiple processors in order to obtain results faster. Parallel computing is based on the fact that the process of solving a problem usually can be divided into smaller tasks, which may be carried out simultaneously with some coordination.

Parallel computers execute parallel algorithms. A parallel algorithm can be split up to be executed a piece at a time on many different processing devices, and then put back together again at the end to get a data processing result. Some algorithms are easy to divide up into pieces. Splitting up the job of checking all of the numbers from one to a hundred thousand to see which are primes could be done, for example, by assigning a subset of the numbers to each available processor, and then putting the list of positive results back together. In this specification, the multiple processing devices that execute the individual pieces of a parallel program are referred to as 'compute nodes.' A parallel computer is composed of compute nodes and other processing nodes as well, including, for example, input/output ('I/O') nodes, and service nodes.

Parallel algorithms are valuable because it is faster to perform some kinds of large computing tasks via a parallel algorithm than it is via a serial (non-parallel) algorithm, because of the way modern processors work. It is far more difficult to construct a computer with a single fast processor than one with many slow processors with the same throughput. There are also certain theoretical limits to the potential speed of serial processors. On the other hand, every parallel algorithm has a serial part and so parallel algorithms have a saturation point. After that point adding more processors does not yield any more throughput but only increases the overhead and cost.

Parallel algorithms are designed also to optimize one more resource the data communications requirements among the nodes of a parallel computer. There are two ways parallel processors communicate, shared memory or message passing. Shared memory processing needs additional locking for the data and imposes the overhead of additional processor and bus cycles and also serializes some portion of the algorithm.

Message passing processing uses high-speed data communications networks and message buffers, but this communication adds transfer overhead on the data communications networks as well as additional memory need for message buffers and latency in the data communications among nodes. Designs of parallel computers use specially designed data communications links so that the communication overhead will be small but it is the parallel algorithm that decides the volume of the traffic.

Many data communications network architectures are used for message passing among nodes in parallel computers. Compute nodes may be organized in a network as a 'torus' or 'mesh,' for example. Also, compute nodes may be organized in a network as a tree. A torus network connects the nodes in a three-dimensional mesh with wrap around links. Every node is connected to its six neighbors through this torus network, and each node is addressed by its x, y, z coordinate in the mesh. In a tree network, the nodes typically are connected into a binary tree: each node has a parent, and two children (although some nodes may only have zero children or one child, depending on the hardware configuration). In computers that use a torus and a tree network, the two networks typically are implemented independently of one another, with separate routing circuits, separate physical links, and separate message buffers. A torus network lends itself to point to point operations, but a tree network typically is inefficient in point to point communication. A tree network, however, does provide high bandwidth and low latency for certain collective operations, message passing operations where all compute nodes participate simultaneously, such as, for example, an allgather operation.

Each pair of adjacent compute nodes in a data communications network is typically connected together using a pair of physical links, one link for each direction of communication between the pair of compute nodes. Occasionally, a physical link between adjacent compute nodes in a network may fail. When such a failure occurs, data communications between the adjacent compute nodes is impaired in at least one direction. Before data communications can be fully restored between two adjacent compute nodes, a system technician must first detect the link that failed. As such, readers will appreciate any improvements in link failure detection in a parallel computer.

SUMMARY OF THE INVENTION

Methods, apparatus, and products are disclosed for link failure detection in a parallel computer including compute nodes connected in a rectangular mesh network, each pair of adjacent compute nodes in the rectangular mesh network connected together using a pair of links, that includes: assigning each compute node to either a first group or a second group such that adjacent compute nodes in the rectangular mesh network are assigned to different groups; sending, by each of the compute nodes assigned to the first group, a first test message to each adjacent compute node assigned to the second group; determining, by each of the compute nodes assigned to the second group, whether the first test message was received from each adjacent compute node assigned to the first group; and notifying a user, by each of the compute nodes assigned to the second group, whether the first test message was received.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
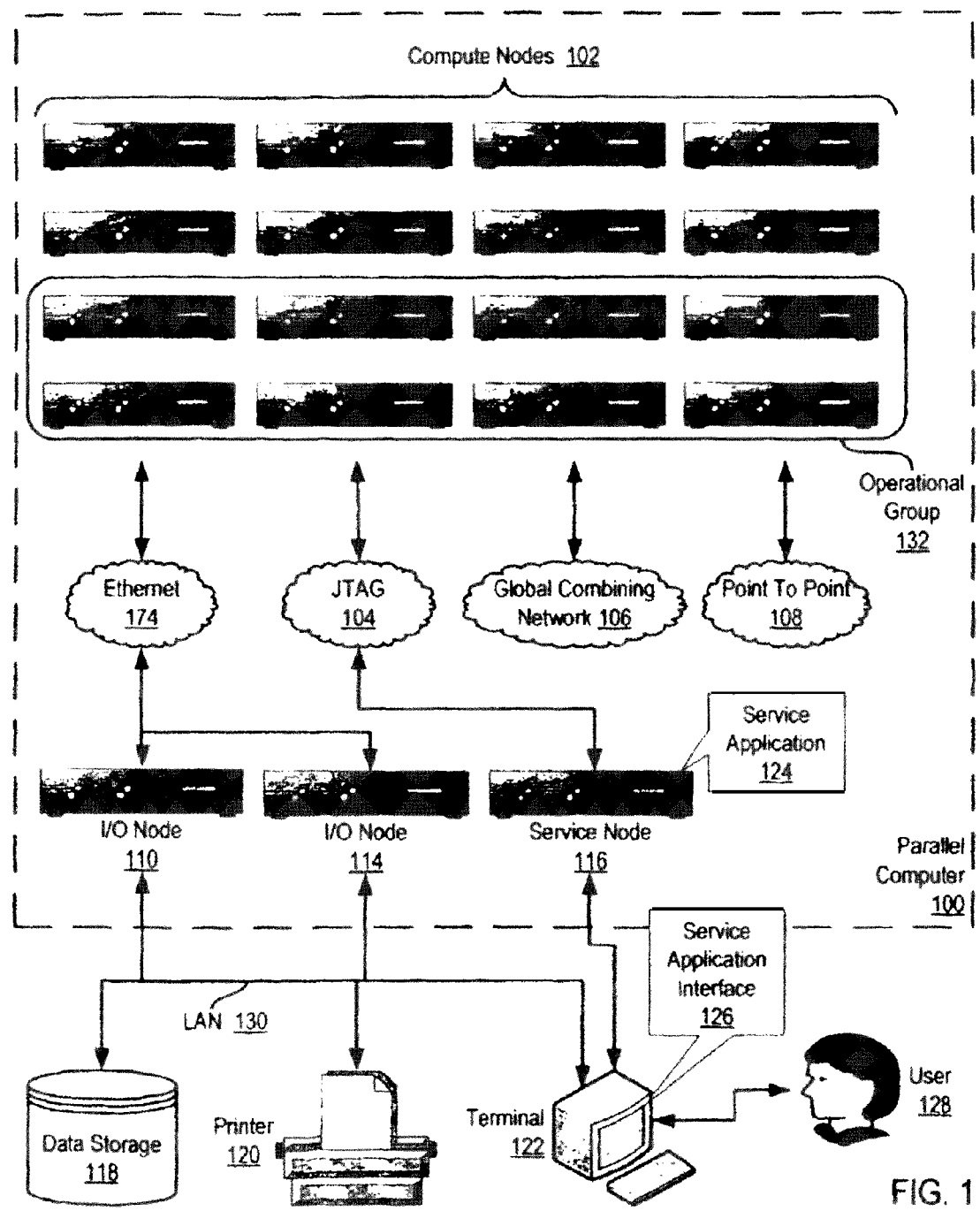
FIG. 1 illustrates an exemplary system for link failure detection in a parallel computer according to embodiments of the present invention.

Exemplary methods, apparatus, and computer program products for link failure detection in a parallel computer according to embodiments of the present invention are described with reference to the accompanying drawings, beginning with FIG. 1. FIG. 1 illustrates an exemplary system for link failure detection in a parallel computer according to embodiments of the present invention. The system of FIG. 1 includes a parallel computer (100), non-volatile memory for the computer in the form of data storage device (118), an output device for the computer in the form of printer (120), and an input/output device for the computer in the form of computer terminal (122). Parallel computer (100) in the example of FIG. 1 includes a plurality of compute nodes (102).

The compute nodes (102) are coupled for data communications by several independent data communications networks including a high speed Ethernet network (174), a Joint Test Action Group ('JTAG') network (104), a global combining network (106) which is optimized for collective operations, and a torus network (108) which is optimized point to point operations. The global combining network (106) is a data communications network that includes data communications links connected to the compute nodes so as to organize the compute nodes as a tree. Each data communications network is implemented with data communications links among the compute nodes (102). The data communications links provide data communications for parallel operations among the compute nodes of the parallel computer.

In addition, the compute nodes (102) of parallel computer are organized into at least one operational group (132) of compute nodes for collective parallel operations on parallel computer (100). An operational group of compute nodes is the set of compute nodes upon which a collective parallel operation executes. Collective operations are implemented with data communications among the compute nodes of an operational group. Collective operations are those functions that involve all the compute nodes of an operational group. A collective operation is an operation, a message-passing computer program instruction that is executed simultaneously, that is, at approximately the same time, by all the compute nodes in an operational group of compute nodes. Such an operational group may include all the compute nodes in a parallel computer (100) or a subset all the compute nodes. Collective operations are often built around point to point operations. A collective operation requires that all processes on all compute nodes within an operational group call the same collective operation with matching arguments. A 'broadcast' is an example of a collective operation for moving data among compute nodes of an operational group. A 'reduce' operation is an example of a collective operation that executes arithmetic or logical functions on data distributed among the compute nodes of an operational group. An operational group may be implemented as, for example, an MPI 'communicator.'

'MPI' refers to 'Message Passing Interface,' a prior art parallel communications library, a module of computer program instructions for data communications on parallel computers. Examples of prior-art parallel communications libraries that may be improved for use with systems according to embodiments of the present invention include MPI and the 'Parallel Virtual Machine' ('PVM') library. PVM was developed by the University of Tennessee, The Oak Ridge National Laboratory, and Emory University. MPI is promulgated by the MPI Forum, an open group with representatives from many organizations that define and maintain the MPI standard. MPI at the time of this writing is a de facto standard for communication among compute nodes running a parallel program on a distributed memory parallel computer. This specification sometimes uses MPI terminology for ease of explanation, although the use of MPI as such is not a requirement or limitation of the present invention.

Some collective operations have a single originating or receiving process running on a particular compute node in an operational group. For example, in a 'broadcast' collective operation, the process on the compute node that distributes the data to all the other compute nodes is an originating process. In a 'gather' operation, for example, the process on the compute node that received all the data from the other compute nodes is a receiving process. The compute node on which such an originating or receiving process runs is referred to as a logical root.

Most collective operations are variations or combinations of four basic operations: broadcast, gather, scatter, and reduce. The interfaces for these collective operations are defined in the MPI standards promulgated by the MPI Forum. Algorithms for executing collective operations, however, are not defined in the MPI standards. In a broadcast operation, all processes specify the same root process, whose buffer contents will be sent. Processes other than the root specify receive buffers. After the operation, all buffers contain the message from the root process.

In a scatter operation, the logical root divides data on the root into segments and distributes a different segment to each compute node in the operational group. In scatter operation, all processes typically specify the same receive count. The send arguments are only significant to the root process, whose buffer actually contains sendcount*N elements of a given data type, where N is the number of processes in the given group of compute nodes. The send buffer is divided and dispersed to all processes (including the process on the logical root). Each compute node is assigned a sequential identifier termed a 'rank.' After the operation, the root has sent sendcount data elements to each process in increasing rank order. Rank 0 receives the first sendcount data elements from the send buffer. Rank 1 receives the second sendcount data elements from the send buffer, and so on.

A gather operation is a many-to-one collective operation that is a complete reverse of the description of the scatter operation. That is, a gather is a many-to-one collective operation in which elements of a datatype are gathered from the ranked compute nodes into a receive buffer in a root node.

A reduce operation is also a many-to-one collective operation that includes an arithmetic or logical function performed on two data elements. All processes specify the same 'count' and the same arithmetic or logical function. After the reduction, all processes have sent count data elements from computer node send buffers to the root process. In a reduction operation, data elements from corresponding send buffer locations are combined pair-wise by arithmetic or logical operations to yield a single corresponding element in the root process's receive buffer. Application specific reduction operations can be defined at runtime. Parallel communications libraries may support predefined operations. MPI, for example, provides the following pre-defined reduction operations:

|  |  |
| --- | --- |
| MPI_MAX | maximum |
| MPI_MIN | minimum |
| MPI_SUM | sum |
| MPI_PROD | product |
| MPI_LAND | logical and |
| MPI_BAND | bitwise and |
| MPI_LOR | logical or |
| MPI_BOR | bitwise or |
| MPI_LXOR | logical exclusive or |
| MPI_BXOR | bitwise exclusive or |

In addition to compute nodes, the parallel computer (100) includes input/output ('I/O') nodes (110, 114) coupled to compute nodes (102) through one of the data communications networks (174). The I/O nodes (110, 114) provide I/O services between compute nodes (102) and I/O devices (118, 120, 122). I/O nodes (110, 114) are connected for data communications I/O devices (118, 120, 122) through local area network ('LAN') (130). The parallel computer (100) also includes a service node (116) coupled to the compute nodes through one of the networks (104). Service node (116) provides service common to pluralities of compute nodes, loading programs into the compute nodes, starting program execution on the compute nodes, retrieving results of program operations on the computer nodes, and so on. Service node (116) runs a service application (124) and communicates with users (128) through a service application interface (126) that runs on computer terminal (122).

As described in more detail below in this specification, the system of FIG. 1 operates generally for link failure detection in a parallel computer according to embodiments of the present invention. The parallel computer includes a plurality of compute nodes connected for data communications in a rectangular mesh network. Each pair of adjacent compute nodes in the rectangular mesh network connected together using a pair of links. The system of FIG. 1 operates generally for link failure detection in a parallel computer according to embodiments of the present invention as follows: each compute node of the rectangular mesh network is assigned to either a first group or a second group such that adjacent compute nodes in the rectangular mesh network are assigned to different groups. Each of the compute nodes assigned to the first group sends a first test message to each adjacent compute node assigned to the second group. Each of the compute nodes assigned to the second group determines whether the first test message was received from each adjacent compute node assigned to the first group and notifies a user whether the first test message was received. Readers will note that if each of the compute nodes assigned to the second group receives the first test message from each adjacent compute node assigned to the first group, then all of the outbound links from the compute nodes assigned to the first group are operating properly. If any of the compute nodes assigned to the second group do not receive a first test message from one of its adjacent compute nodes assigned to the first group, then the outbound link from that particular compute node assigned to the first group to compute node assigned to second group has failed.

The system of FIG. 1 may also operate generally for link failure detection in a parallel computer according to embodiments of the present invention as follows: each of the compute nodes assigned the second group may send a second test message to each adjacent compute node assigned to the first group. Each of the compute nodes assigned to the first group may determine whether the second test message was received from each adjacent compute node assigned to the second group and notify the user whether the second test message was received. Readers will note that if each of the compute nodes assigned to the first group receives the second test message from each adjacent compute node assigned to the second group, then all of the outbound links from the compute nodes assigned to the second group are operating properly. If any of the compute nodes assigned to the first group do not receive a second test message from one of its adjacent compute nodes assigned to the second group, then the outbound link from that particular compute node assigned to the second group to compute node assigned to first group has failed.

The arrangement of nodes, networks, and I/O devices making up the exemplary system illustrated in FIG. 1 are for explanation only, not for limitation of the present invention. Data processing systems capable of link failure detection in a parallel computer according to embodiments of the present invention may include additional nodes, networks, devices, and architectures, not shown in FIG. 1, as will occur to those of skill in the art. Although the parallel computer (100) in the example of FIG. 1 includes sixteen compute nodes (102), readers will note that parallel computers capable of determining when a set of compute nodes participating in a barrier operation are ready to exit the barrier operation according to embodiments of the present invention may include any number of compute nodes. In addition to Ethernet and JTAG, networks in such data processing systems may support many data communications protocols including for example TCP (Transmission Control Protocol), IP (Internet Protocol), and others as will occur to those of skill in the art. Various embodiments of the present invention may be implemented on a variety of hardware platforms in addition to those illustrated in FIG. 1.

Link failure detection according to embodiments of the present invention may be generally implemented on a parallel computer that includes a plurality of compute nodes. In fact, such computers may include thousands of such compute nodes. Each compute node is in turn itself a kind of computer composed of one or more computer processors (or processing cores), its own computer memory, and its own input/output adapters. For further explanation, therefore, FIG. 2 sets forth a block diagram of an exemplary compute node useful in a parallel computer capable of link failure detection according to embodiments of the present invention. The compute node (152) of FIG. 2 includes one or more processing cores (164) as well as random access memory ('RAM') (156). The processing cores (164) are connected to RAM (156) through a high-speed memory bus (154) and through a bus adapter (194) and an extension bus (168) to other components of the compute node (152). Stored in RAM (156) is an application program (158), a module of computer program instructions that carries out parallel, user-level data processing using parallel algorithms.

Also stored in RAM (156) is a messaging module (160), a library of computer program instructions that carry out parallel communications among compute nodes, including point to point operations as well as collective operations. Application program (158) executes collective operations by calling software routines in the messaging module (160). A library of parallel communications routines may be developed from scratch for use in systems according to embodiments of the present invention, using a traditional programming language such as the C programming language, and using traditional programming methods to write parallel communications routines that send and receive data among nodes on two independent data communications networks. Alternatively, existing prior art libraries may be improved to operate according to embodiments of the present invention. Examples of prior-art parallel communications libraries include the 'Message Passing Interface' ('MPI') library and the 'Parallel Virtual Machine' ('PVM') library.

Also stored in RAM (156) is an operating system (162), a module of computer program instructions and routines for an application program's access to other resources of the compute node. It is typical for an application program and parallel communications library in a compute node of a parallel computer to run a single thread of execution with no user login and no security issues because the thread is entitled to complete access to all resources of the node. The quantity and complexity of tasks to be performed by an operating system on a compute node in a parallel computer therefore are smaller and less complex than those of an operating system on a serial computer with many threads running simultaneously. In addition, there is no video I/O on the compute node (152) of FIG. 2, another factor that decreases the demands on the operating system. The operating system may therefore be quite lightweight by comparison with operating systems of general purpose computers, a pared down version as it were, or an operating system developed specifically for operations on a particular parallel computer. Operating systems that may usefully be improved, simplified, for use in a compute node include UNIX™, Linux™, Microsoft XP™, AIX™, IBM's i5/OS™, and others as will occur to those of skill in the art.

Figure 2:
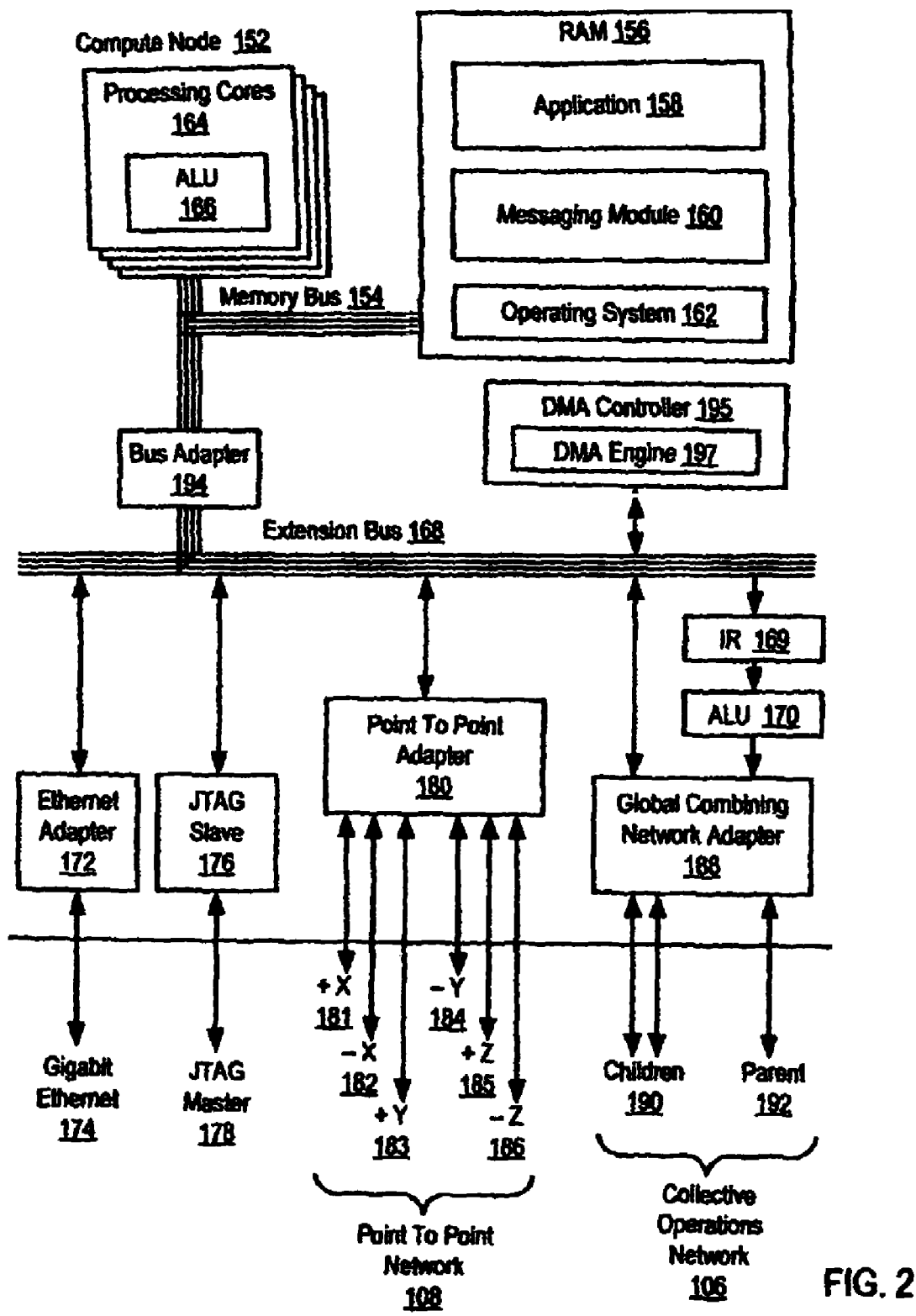
FIG. 2 sets forth a block diagram of an exemplary compute node useful in a parallel computer capable of link failure detection according to embodiments of the present invention.

The exemplary compute node (152) of FIG. 2 includes several communications adapters (172, 176, 180, 188) for implementing data communications with other nodes of a parallel computer. Such data communications may be carried out serially through RS-232 connections, through external buses such as Universal Serial Bus ('USB'), through data communications networks such as IP networks, and in other ways as will occur to those of skill in the art. Communications adapters implement the hardware level of data communications through which one computer sends data communications to another computer, directly or through a network. Examples of communications adapters useful in systems for link failure detection in a parallel computer according to embodiments of the present invention include modems for wired communications, Ethernet (IEEE 802.3) adapters for wired network communications, and 802.11b adapters for wireless network communications.

The data communications adapters in the example of FIG. 2 include a Gigabit Ethernet adapter (172) that couples example compute node (152) for data communications to a Gigabit Ethernet (174). Gigabit Ethernet is a network transmission standard, defined in the IEEE 802.3 standard, that provides a data rate of 1 billion bits per second (one gigabit). Gigabit Ethernet is a variant of Ethernet that operates over multimode fiber optic cable, single mode fiber optic cable, or unshielded twisted pair.

The data communications adapters in the example of FIG. 2 includes a JTAG Slave circuit (176) that couples example compute node (152) for data communications to a JTAG Master circuit (178). JTAG is the usual name used for the IEEE 1149.1 standard entitled Standard Test Access Port and Boundary-Scan Architecture for test access ports used for testing printed circuit boards using boundary scan. JTAG is so widely adapted that, at this time, boundary scan is more or less synonymous with JTAG. JTAG is used not only for printed circuit boards, but also for conducting boundary scans of integrated circuits, and is also useful as a mechanism for debugging embedded systems, providing a convenient "back door" into the system. The example compute node of FIG. 2 may be all three of these: it typically includes one or more integrated circuits installed on a printed circuit board and may be implemented as an embedded system having its own processor, its own memory, and its own I/O capability. JTAG boundary scans through JTAG Slave (176) may efficiently configure processor registers and memory in compute node (152) for use in link failure detection in a parallel computer according to embodiments of the present invention.

The data communications adapters in the example of FIG. 2 includes a Point To Point Adapter (180) that couples example compute node (152) for data communications to a network (108) that is optimal for point to point message passing operations such as, for example, a network configured as a three-dimensional torus or mesh. Point To Point Adapter (180) provides data communications in six directions on three communications axes, x, y, and z, through six bidirectional links: +x (181), −x (182), +y (183), −y (184), +z (185), and −z (186).

The data communications adapters in the example of FIG. 2 includes a Global Combining Network Adapter (188) that couples example compute node (152) for data communications to a network (106) that is optimal for collective message passing operations on a global combining network configured, for example, as a binary tree. The Global Combining Network Adapter (188) provides data communications through three bidirectional links: two to children nodes (190) and one to a parent node (192).

Example compute node (152) includes two arithmetic logic units ('ALUs'). ALU (166) is a component of each processing core (164), and a separate ALU (170) is dedicated to the exclusive use of Global Combining Network Adapter (188) for use in performing the arithmetic and logical functions of reduction operations. Computer program instructions of a reduction routine in parallel communications library (160) may latch an instruction for an arithmetic or logical function into instruction register (169). When the arithmetic or logical function of a reduction operation is a 'sum' or a 'logical or,' for example, Global Combining Network Adapter (188) may execute the arithmetic or logical operation by use of ALU (166) in processor (164) or, typically much faster, by use dedicated ALU (170).

The example compute node (152) of FIG. 2 includes a direct memory access ('DMA') controller (195), which is computer hardware for direct memory access and a DMA engine (197), which is computer software for direct memory access. In the example of FIG. 2, the DMA engine (197) is configured in computer memory of the DMA controller (195). Direct memory access includes reading and writing to memory of compute nodes with reduced operational burden on the central processing units (164). A DMA transfer essentially copies a block of memory from one location to another, typically from one compute node to another. While the CPU may initiate the DMA transfer, the CPU does not execute it.

As mentioned above, the compute node (152) of FIG. 2 is useful in a parallel computer capable of link failure detection according to embodiments of the present invention. The parallel computer includes a plurality of compute nodes connected for data communications in a rectangular mesh network. Each pair of adjacent compute nodes in the rectangular mesh network connected together using a pair of links. This parallel computer operates generally for link failure detection according to embodiments of the present invention as follows: each compute node of the rectangular mesh network is assigned to either a first group or a second group such that adjacent compute nodes in the rectangular mesh network are assigned to different groups. Each of the compute nodes assigned to the first group sends a first test message to each adjacent compute node assigned to the second group. Each of the compute nodes assigned to the second group determines whether the first test message was received from each adjacent compute node assigned to the first group and notifies a user whether the first test message was received. The parallel computer may also operate generally for link failure detection in a parallel computer according to embodiments of the present invention as follows: each of the compute nodes assigned the second group may send a second test message to each adjacent compute node assigned to the first group. Each of the compute nodes assigned to the first group may determine whether the second test message was received from each adjacent compute node assigned to the second group and notify the user whether the second test message was received.

Figure 3A:
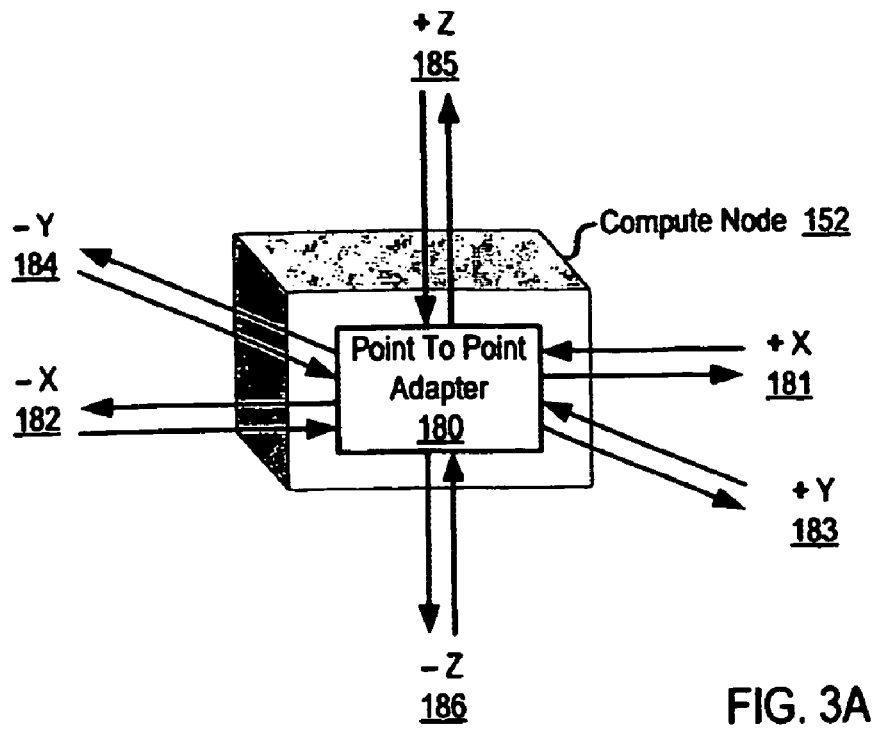
FIG. 3A illustrates an exemplary Point To Point Adapter useful in systems capable of link failure detection in a parallel computer according to embodiments of the present invention.

For further explanation, FIG. 3A illustrates an exemplary Point To Point Adapter (180) useful in systems capable of link failure detection in a parallel computer according to embodiments of the present invention. Point To Point Adapter (180) is designed for use in a data communications network optimized for point to point operations, a network that organizes compute nodes in a three-dimensional torus or mesh. Point To Point Adapter (180) in the example of FIG. 3A provides data communication along an x-axis through four unidirectional data communications links, to and from the next node in the −x direction (182) and to and from the next node in the +x direction (181). Point To Point Adapter (180) also provides data communication along a y-axis through four unidirectional data communications links, to and from the next node in the −y direction (184) and to and from the next node in the +y direction (183). Point To Point Adapter (180) in FIG. 3A also provides data communication along a z-axis through four unidirectional data communications links, to and from the next node in the −z direction (186) and to and from the next node in the +z direction (185).

Figure 3B:
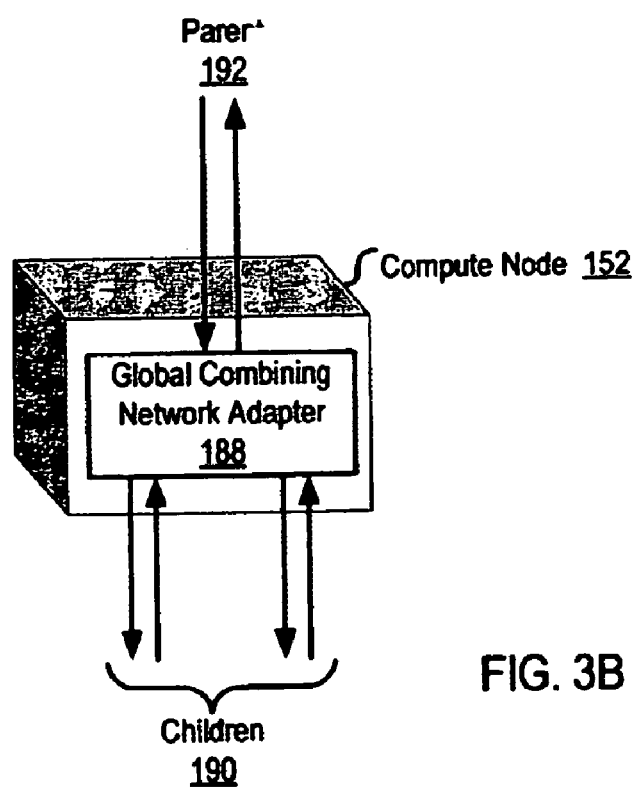
FIG. 3B illustrates an exemplary Global Combining Network Adapter useful in systems capable of link failure detection in a parallel computer according to embodiments of the present invention.

For further explanation, FIG. 3B illustrates an exemplary Global Combining Network Adapter (188) useful in systems capable of link failure detection in a parallel computer according to embodiments of the present invention. Global Combining Network Adapter (188) is designed for use in a network optimized for collective operations, a network that organizes compute nodes of a parallel computer in a binary tree. Global Combining Network Adapter (188) in the example of FIG. 3B provides data communication to and from two children nodes through four unidirectional data communications links (190). Global Combining Network Adapter (188) also provides data communication to and from a parent node through two unidirectional data communications links (192).

Figure 4:
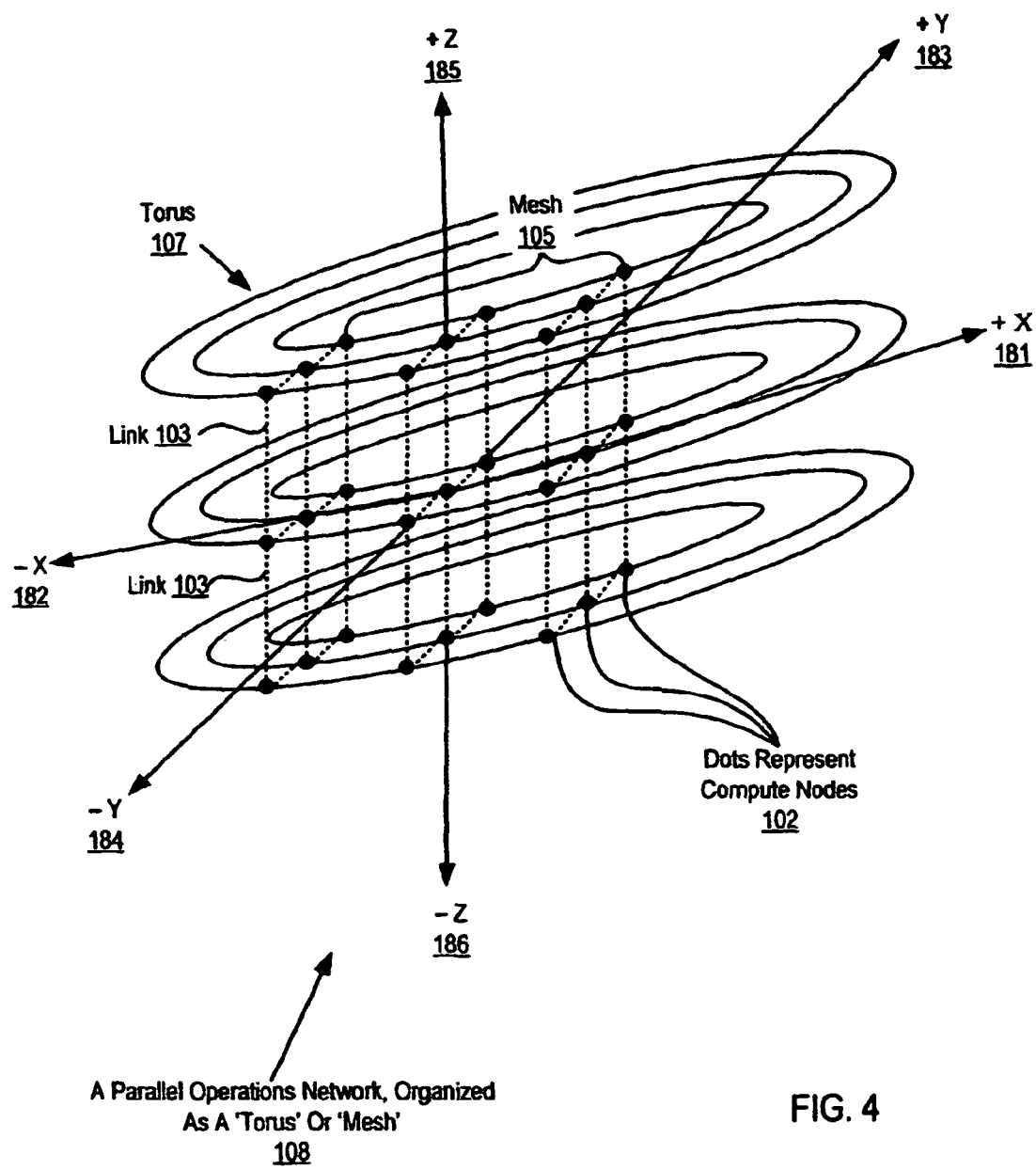
FIG. 4 sets forth a line drawing illustrating an exemplary data communications network optimized for point to point operations useful in systems capable of link failure detection in a parallel computer in accordance with embodiments of the present invention.

For further explanation, FIG. 4 sets forth a line drawing illustrating an exemplary data communications network (108) optimized for point to point operations useful in systems capable of link failure detection in a parallel computer in accordance with embodiments of the present invention. In the example of FIG. 4, dots represent compute nodes (102) of a parallel computer, and the dotted lines between the dots represent data communications links (103) between compute nodes. The data communications links are implemented with point to point data communications adapters similar to the one illustrated for example in FIG. 3A, with data communications links on three axes, x, y, and z, and to and from in six directions +x (181), −x (182), +y (183), −y (184), +z (185), and −z (186). The links and compute nodes are organized by this data communications network optimized for point to point operations into a three dimensional mesh (105). The mesh (105) has wrap-around links on each axis that connect the outermost compute nodes in the mesh (105) on opposite sides of the mesh (105). These wrap-around links form part of a torus (107). Each compute node in the torus has a location in the torus that is uniquely specified by a set of x, y, z coordinates. Readers will note that the wrap-around links in the y and z directions have been omitted for clarity, but are configured in a similar manner to the wrap-around link illustrated in the x direction. For clarity of explanation, the data communications network of FIG. 4 is illustrated with only 27 compute nodes, but readers will recognize that a data communications network optimized for point to point operations for use in link failure detection in a parallel computer in accordance with embodiments of the present invention may contain only a few compute nodes or may contain thousands of compute nodes.

Figure 5:
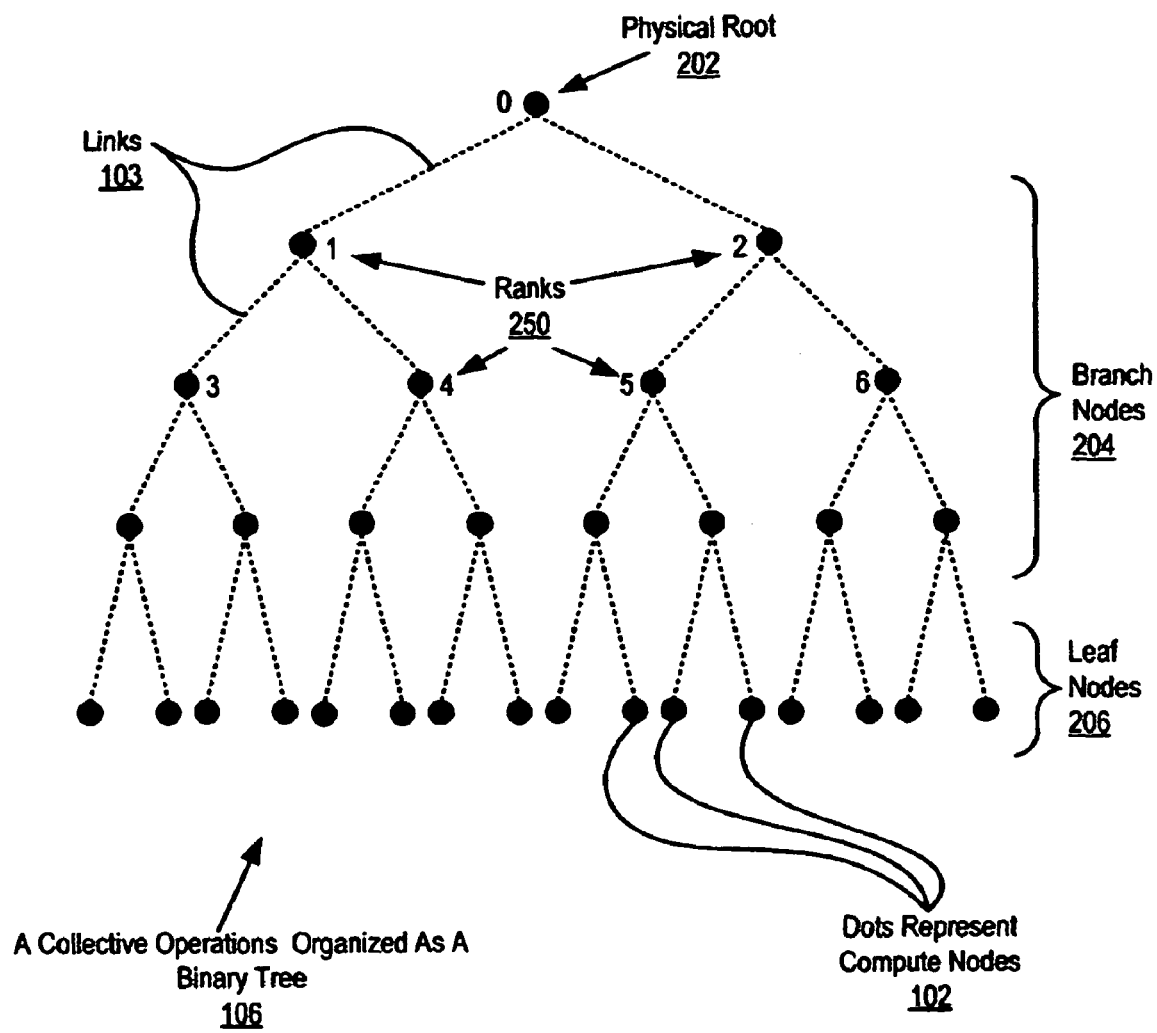
FIG. 5 sets forth a line drawing illustrating an exemplary data communications network optimized for collective operations useful in systems capable of link failure detection in a parallel computer in accordance with embodiments of the present invention.

For further explanation, FIG. 5 sets forth a line drawing illustrating an exemplary data communications network (106) optimized for collective operations useful in systems capable of link failure detection in a parallel computer in accordance with embodiments of the present invention. The example data communications network of FIG. 5 includes data communications links connected to the compute nodes so as to organize the compute nodes as a tree. In the example of FIG. 5, dots represent compute nodes (102) of a parallel computer, and the dotted lines (103) between the dots represent data communications links between compute nodes. The data communications links are implemented with global combining network adapters similar to the one illustrated for example in FIG. 3B, with each node typically providing data communications to and from two children nodes and data communications to and from a parent node, with some exceptions. Nodes in a binary tree (106) may be characterized as a physical root node (202), branch nodes (204), and leaf nodes (206). The root node (202) has two children but no parent. The leaf nodes (206) each has a parent, but leaf nodes have no children. The branch nodes (204) each has both a parent and two children. The links and compute nodes are thereby organized by this data communications network optimized for collective operations into a binary tree (106). For clarity of explanation, the data communications network of FIG. 5 is illustrated with only 31 compute nodes, but readers will recognize that a data communications network optimized for collective operations for use in systems for link failure detection in a parallel computer accordance with embodiments of the present invention may contain only a few compute nodes or may contain thousands of compute nodes.

In the example of FIG. 5, each node in the tree is assigned a unit identifier referred to as a 'rank' (250). A node's rank uniquely identifies the node's location in the tree network for use in both point to point and collective operations in the tree network. The ranks in this example are assigned as integers beginning with 0 assigned to the root node (202), 1 assigned to the first node in the second layer of the tree, 2 assigned to the second node in the second layer of the tree, 3 assigned to the first node in the third layer of the tree, 4 assigned to the second node in the third layer of the tree, and so on. For ease of illustration, only the ranks of the first three layers of the tree are shown here, but all compute nodes in the tree network are assigned a unique rank.

Figure 6:
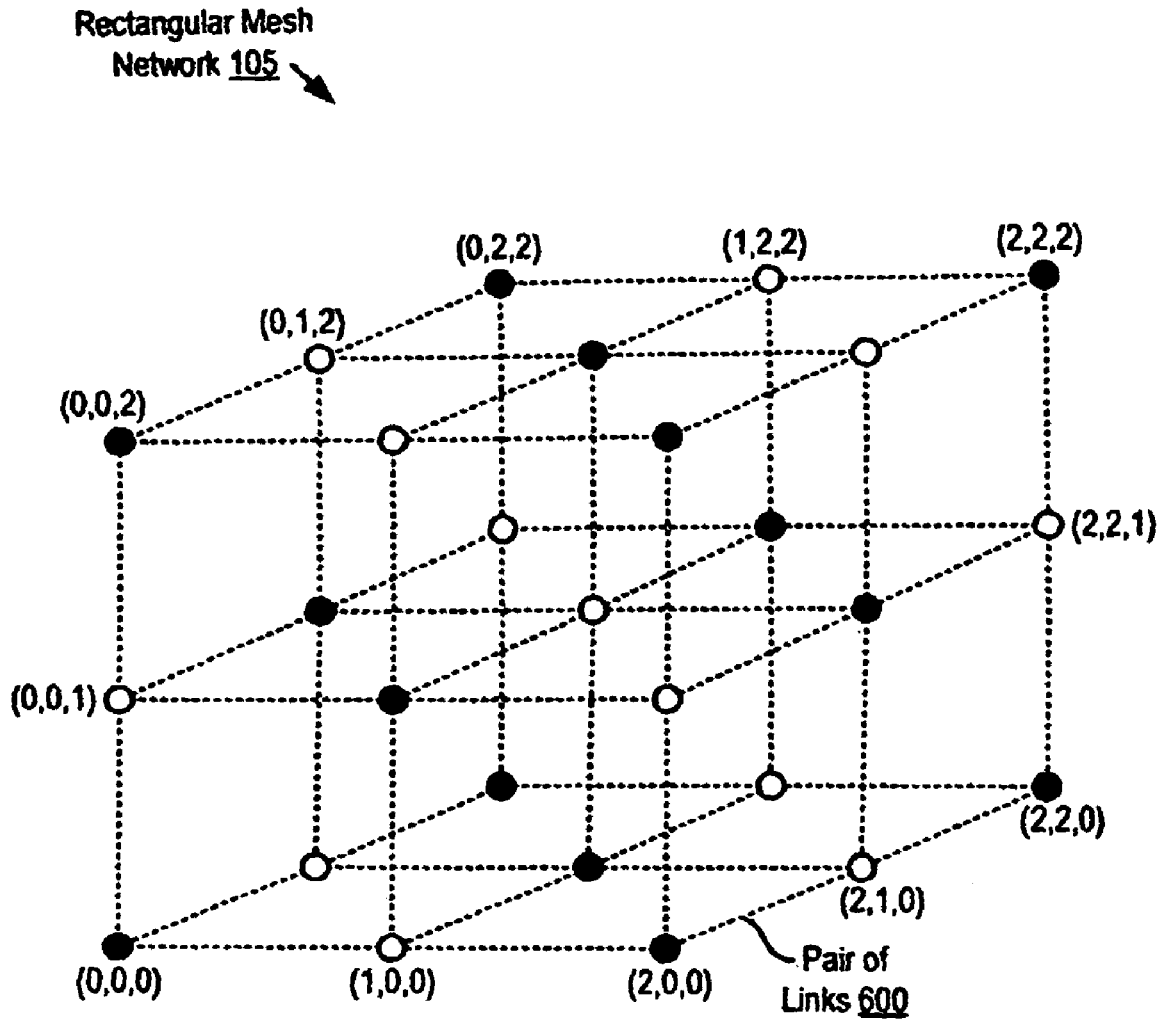
FIG. 6 sets forth a line drawing illustrating an exemplary rectangular mesh network useful in systems capable of link failure detection in a parallel computer in accordance with embodiments of the present invention.

FIG. 6 sets forth a line drawing illustrating an exemplary rectangular mesh network useful in systems capable of link failure detection in a parallel computer in accordance with embodiments of the present invention. The rectangular mesh network (105) of FIG. 6 connects twenty-seven compute nodes for data communications in a parallel computer. Each pair of adjacent compute nodes in the rectangular mesh network (105) is connected together using a pair (600) of links. Each compute node in the rectangular mesh network (105) is assigned a coordinate. In particular, each compute node in the rectangular mesh network (105) is assigned an X-coordinate, a Y-coordinate, and a Z-coordinate. FIG. 6 illustrates a coordinate assigned to a compute node in the form (X-coordinate, Y-coordinate, Z-coordinate). Readers will note that the coordinates for some of the compute nodes illustrated in FIG. 6 are omitted for clarity.

In the example of FIG. 6, each compute node is assigned to either a first group or a second group such that adjacent compute nodes in the rectangular mesh network (105) are assigned to different groups. Each compute nodes may be assigned to either the first group or second group by a service node of the parallel computer or by each compute node itself. Each compute node may be assigned to either the first group or second group in dependence upon the coordinate assigned to the compute node. In the example of FIG. 6, each compute node may be assigned to either the first group or second group by: calculating a group value for each compute node such that the group value for each compute node is a modulus two of a sum of modulus two of the X-coordinate, modulus two of the Y-coordinate, and modulus two of the Z-coordinate; assigning each compute node having group value of zero to the first group; and assigning each compute node having a group value of one to the second group.

For further explanation, consider the compute node illustrated in FIG. 6 having a coordinate of (0,0,0). The group value may be calculated in the following manner:

$$GV_{(0,0,0)} = ((X \text{ MOD } 2) + (Y \text{ MOD } 2) + (Z \text{ MOD } 2)) \text{ MOD } 2$$
$$= ((0 \text{ MOD } 2) + (0 \text{ MOD } 2) + (0 \text{ MOD } 2)) \text{ MOD } 2$$
$$= (0 + 0 + 0) \text{ MOD } 2$$
$$= (0) \text{ MOD } 2$$
$$GV_{(0,0,0)} = 0,$$

where $GV_{(0,0,0)}$ is the group value for the compute node having the coordinate (0,0,0), X is the value of the X-coordinate, Y is the value of the Y-coordinate, Z is the value of the Z-coordinate. Because the compute node having the coordinate (0,0,0) has a group value of zero, the compute node may be assigned to the first group. For still further explanation, consider the compute node illustrated in FIG. 6 having a coordinate of (1,0,0). The group value may be calculated in the following manner:

$$GV_{(1,0,0)} = ((X \text{ MOD } 2) + (Y \text{ MOD } 2) + (Z \text{ MOD } 2)) \text{ MOD } 2$$
$$= ((1 \text{ MOD } 2) + (0 \text{ MOD } 2) + (0 \text{ MOD } 2)) \text{ MOD } 2$$
$$= (1 + 0 + 0) \text{ MOD } 2$$
$$= (1) \text{ MOD } 2$$
$$GV_{(1,0,0)} = 1,$$

where $GV_{(1,0,0)}$ is the group value for the compute node having the coordinate (0,0,0), X is the value of the X-coordinate, Y is the value of the Y-coordinate, Z is the value of the Z-coordinate. Because the compute node having the coordinate (1,0,0) has a group value of one, the compute node may be assigned to the second group.

Readers will note that assigning each compute node in the rectangular mesh network (105) to either the first group or second group in the manner described above is for explanation and not for limitation. In fact, any manner of assigning each compute node to either the first group or second group such that adjacent compute nodes in the rectangular mesh network (105) are assigned to different groups as will occur to those of skill in the art may be useful in link failure detection in a parallel computer according to embodiments of the present invention. Readers will also note that for clarity of explanation, the rectangular mesh network (105) of FIG. 6 is illustrated with only twenty-seven compute nodes, but readers will recognize that a rectangular mesh network for use in parallel computers capable of link failure detection in accordance with embodiments of the present invention may contain any number of compute nodes as will occur to those of skill in the art.

In the example of FIG. 6, each compute node operates for link failure detection in a parallel computer according to embodiments of the present invention. Each compute node operates generally for link failure detection in a parallel computer according to embodiments of the present invention as follows: each of the compute nodes assigned to the first group sends a first test message to each adjacent compute node assigned to the second group. Each of the compute nodes assigned to the second group determines whether the first test message was received from each adjacent compute node assigned to the first group and notifies a user whether the first test message was received. Each compute node may also operate generally for link failure detection in a parallel computer according to embodiments of the present invention as follows: each of the compute nodes assigned the second group may send a second test message to each adjacent compute node assigned to the first group. Each of the compute nodes assigned to the first group may determine whether the second test message was received from each adjacent compute node assigned to the second group and notify the user whether the second test message was received.

Figure 7:
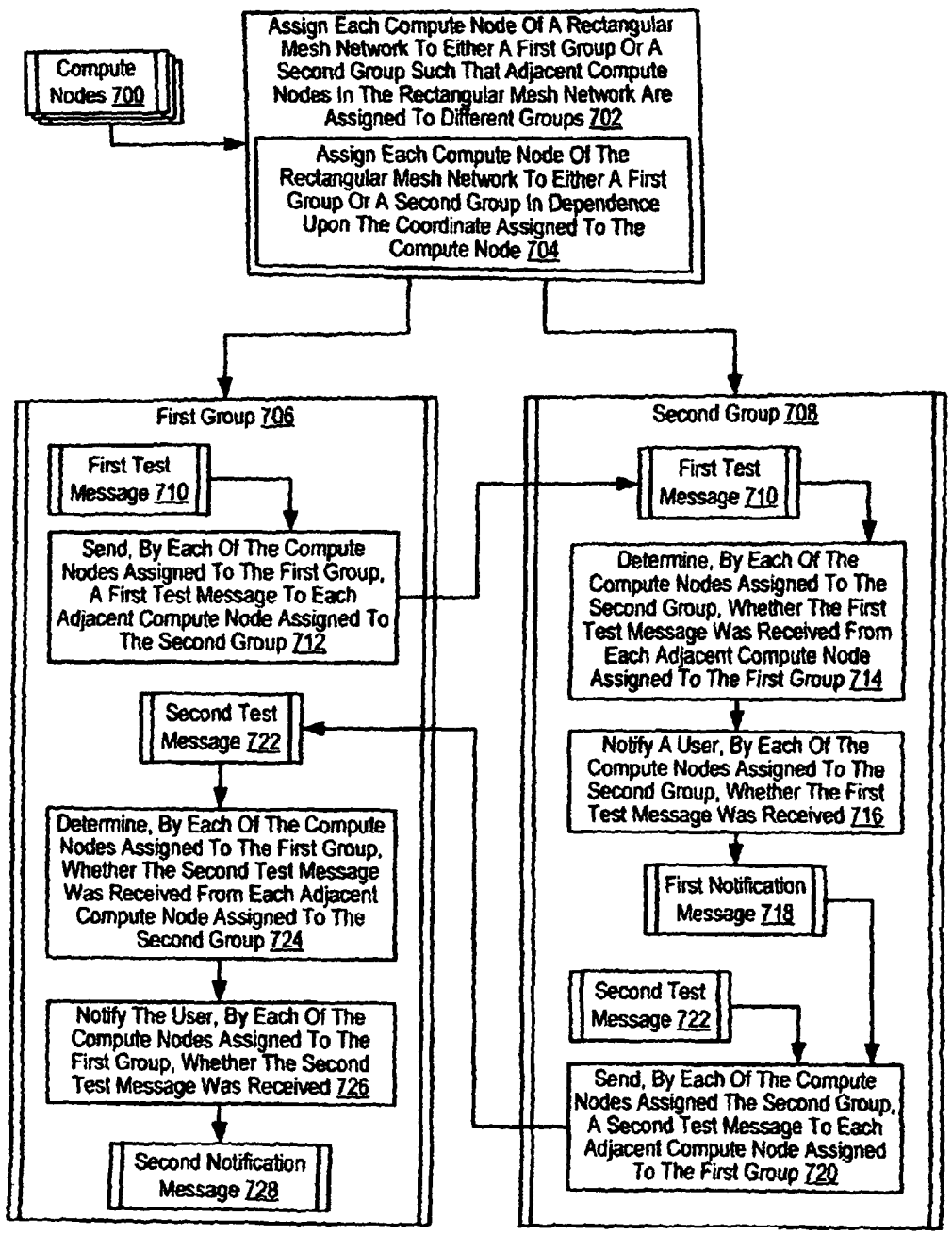
FIG. 7 sets forth a flow chart illustrating an exemplary method for link failure detection in a parallel computer according to the present invention.

For further explanation, FIG. 7 sets forth a flow chart illustrating an exemplary method for link failure detection in a parallel computer according to the present invention. The parallel computer includes a plurality of compute nodes (700) connected for data communications in a rectangular mesh network. Each pair of adjacent compute nodes in the rectangular mesh network is connected together using a pair of links, each link providing data communications between the pair of nodes in one direction.

The method of FIG. 7 includes assigning (702) each compute node (700) of the rectangular mesh network to either a first group (706) or a second group (708) such that adjacent compute nodes in the rectangular mesh network are assigned to different groups. Assigning (702) each compute node (700) of the rectangular mesh network to either a first group (706) or a second group (708) according to the method of FIG. 7 may be carried out by a service node for the parallel computer or by each compute node itself. A service node for the parallel computer may assign (702) each compute node (700) of the rectangular mesh network to either a first group (706) or a second group (708) according to the method of FIG. 7 by storing value in a group identifier field on each compute node. For example, storing a value of '0' in the group identifier field may indicate that the compute node is assigned to the first group, and storing a value of '1' in the group identifier field may indicate that the compute node is assigned to the second group. Similarly, each compute node of the rectangular mesh network may assign (702) itself to either the first group (706) or the second group (708) according to the method of FIG. 7 by storing value in a group identifier field on that compute node.

Assigning (702) each compute node (700) of the rectangular mesh network to either a first group (706) or a second group (708) according to the method of FIG. 7 includes assigning (704) each compute node of the rectangular mesh network to either the first group (706) or the second group (708) in dependence upon a coordinate assigned to the compute node. In the example of FIG. 7, each compute node (700) in the rectangular mesh network is assigned a coordinate. In particular, each compute node (700) in the rectangular mesh network is assigned an X-coordinate, a Y-coordinate, and a Z-coordinate. Assigning (704) each compute node of the rectangular mesh network to either the first group (706) or the second group (708) in dependence upon a coordinate assigned to the compute node according to the method of FIG. 7 may be carried out by: calculating a group value for each compute node such that the group value for each compute node is the modulus two of a sum of the modulus two of the X-coordinate, the modulus two of the Y-coordinate, and the modulus two of the Z-coordinate; assigning each compute node having group value of zero to the first group; and assigning each compute node having a group value of one to the second group.

For further explanation, consider the following two examples of assigning a compute node of a rectangular mesh network to either a first group or a second group by calculating a group value for the compute node, assigning the compute node to the first group if the group value is zero, and assigning the compute node to the second group if the group value is one. In the first example, consider that the compute node is assigned a coordinate of (0,0,0). The group value may be calculated in the following manner:

$$GV_{(0,0,0)} = ((X \text{ MOD } 2) + (Y \text{ MOD } 2) + (Z \text{ MOD } 2)) \text{ MOD } 2$$
$$= ((0 \text{ MOD } 2) + (0 \text{ MOD } 2) + (0 \text{ MOD } 2)) \text{ MOD } 2$$
$$= (0 + 0 + 0) \text{ MOD } 2$$
$$= (0) \text{ MOD } 2$$
$$GV_{(0,0,0)} = 0,$$

where $GV_{(0,0,0)}$ is the group value for the compute node having the coordinate (0,0,0), X is the value of the X-coordinate, Y is the value of the Y-coordinate, Z is the value of the Z-coordinate. Because the compute node having the coordinate (0,0,0) has a group value of zero, the compute node may be assigned to the first group.

In the second example, consider that the compute node is assigned a coordinate of (1,0,0). The group value may be calculated in the following manner:

$$GV_{(1,0,0)} = ((X \text{ MOD } 2) + (Y \text{ MOD } 2) + (Z \text{ MOD } 2)) \text{ MOD } 2$$
$$= ((1 \text{ MOD } 2) + (0 \text{ MOD } 2) + (0 \text{ MOD } 2)) \text{ MOD } 2$$
$$= (1 + 0 + 0) \text{ MOD } 2$$
$$= (1) \text{ MOD } 2$$
$$GV_{(1,0,0)} = 1,$$

where $GV_{(1,0,0)}$ is the group value for the compute node having the coordinate (0,0,0), X is the value of the X-coordinate, Y is the value of the Y-coordinate, Z is the value of the Z-coordinate. Because the compute node having the coordinate (1,0,0) has a group value of one, the compute node may be assigned to the second group.

Readers will note that assigning each compute node (700) in the rectangular mesh network to either the first group (706) or the second group (708) in the manner described above is for explanation and not for limitation. In fact, any manner of assigning each compute node (700) to either the first group (706) or second group (708) such that adjacent compute nodes in the rectangular mesh network are assigned to different groups as will occur to those of skill in the art may be useful in link failure detection in a parallel computer according to embodiments of the present invention.

The method of FIG. 7 also includes sending (712), by each of the compute nodes (700) assigned to the first group (706), a first test message (710) to each adjacent compute node (700) assigned to the second group (708). The first test message (710) of FIG. 7 represents a message used to test the outbound links of a compute node in the rectangular mesh network assigned to the first group (706). Each of the compute nodes (700) assigned to the first group (706) may send (712) a first test message (710) to each adjacent compute node (700) assigned to the second group (708) according to the method of FIG. 7 by encapsulating a node identifier for the compute node assigned to the first group (706) in the first test message (710) as the source of the message (710), configuring each adjacent compute node assigned to the second group (708) as the destination for the message (710), and injecting the first test message (710) in the injection stacks corresponding to each link of a point to point network adapter for the compute node assigned to the first group (706). In such a manner, the first test message (710) is transmitted on the outbound link from each compute node assigned to the first group (706) to each of adjacent compute node assigned to the second group (708).

Readers will note that a service node for the parallel computer may configure a particular compute node with the node identifier or network address for each of its adjacent compute nodes. When configuring the first test message (710), therefore, each of the compute nodes (700) assigned to the first group (706) may identify its adjacent compute nodes from a list established on the compute node by a service node for the parallel computer.

The method of FIG. 7 includes determining (714), by each of the compute nodes (700) assigned to the second group (708), whether the first test message (710) was received from each adjacent compute node (700) assigned to the first group (706). Each of the compute nodes (700) assigned to the second group (708) may determine (714) whether the first test message (710) was received from each adjacent compute node (700) assigned to the first group (706) according to the method of FIG. 7 by comparing the source node identifier in each first test message (710) that is received with a list of adjacent compute nodes, identifying the adjacent compute nodes from which a first test message (710) was received, and identifying the adjacent compute nodes from which a first test message (710) was not received.

The method of FIG. 7 also includes notifying (716) a user, by each of the compute nodes (700) assigned to the second group (708), whether the first test message (710) was received. Each of the compute nodes (700) assigned to the second group (708) may notify (716) a user whether the first test message (710) was received according to the method of FIG. 7 through a service node for the parallel computer, which in turn may provide the user with the notification through a remote terminal running a user interface. Each of the compute nodes (700) assigned to the second group (708) may notify (716) a user whether the first test message (710) was received according to the method of FIG. 7 by sending a first notification message (718) to the user for each first test message (710) that was received from an adjacent compute node assigned to the first group (706). In other embodiments, however, each of the compute nodes (700) assigned to the second group (708) may also notify (716) a user whether the first test message (710) was received according to the method of FIG. 7 by sending the first notification message (718) to the user for each first test message (710) that was not received from an adjacent compute node assigned to the first group (706). Readers will note that the methods of notifying (716) a user, by each of the compute nodes (700) assigned to the second group (708), whether the first test message (710) was received as described above are for explanation and not for limitation. In fact, any manner of notifying (716) a user, by each of the compute nodes (700) assigned to the second group (708), whether the first test message (710) was received as will occur to those of skill in the art may be useful in link failure detection in a parallel computer according to embodiments of the present invention.

The method of FIG. 7 also includes sending (720), by each of the compute nodes (700) assigned the second group (708), a second test message (722) to each adjacent compute node (700) assigned to the first group (706). The second test message (722) of FIG. 7 represents a message used to test the outbound links of a compute node in the rectangular mesh network assigned to the second group (708). Each of the compute nodes (700) assigned to the second group (708) may send (720) a second test message (722) to each adjacent compute node (700) assigned to the first group (706) according to the method of FIG. 7 by encapsulating a node identifier for the compute node assigned to the second group (708) in the second test message (722) as the source of the message (722), configuring each adjacent compute node assigned to the first group (706) as the destination for the message (722), and injecting the second test message (722) in the injection stacks corresponding to each link of a point to point network adapter for the compute node assigned to the second group (708). In such a manner, the second test message (722) is transmitted on the outbound link from each compute node assigned to the second group (708) to each of adjacent compute node assigned to the first group (706).

The method of FIG. 7 includes determining (724), by each of the compute nodes (700) assigned to the first group (706), whether the second test message (722) was received from each adjacent compute node (700) assigned to the second group (708). Each of the compute nodes (700) assigned to the first group (706) may determine (724) whether the second test message (722) was received from each adjacent compute node (700) assigned to the second group (708) according to the method of FIG. 7 by comparing the source node identifier in each second test message (722) that is received with a list of adjacent compute nodes, identifying the adjacent compute nodes from which a second test message (722) was received, and identifying the adjacent compute nodes from which a second test message (722) was not received.

The method of FIG. 7 also includes notifying (726) the user, by each of the compute nodes (700) assigned to the first group (706), whether the second test message (722) was received. Each of the compute nodes (700) assigned to the first group (706) may notify (726) a user whether the second test message (722) was received according to the method of FIG. 7 through a service node for the parallel computer, which in turn may provide the user with the notification through a remote terminal running a user interface. Each of the compute nodes (700) assigned to the first group (706) may notify (726) a user whether the second test message (722) was received according to the method of FIG. 7 by sending a second notification message (728) to the user for each second test message (722) that was received from an adjacent compute node assigned to the second group (708). In other embodiments, however, each of the compute nodes (700) assigned to the first group (708) may also notify (726) a user whether the second test message (722) was received according to the method of FIG. 7 by sending the second notification message (728) to the user for each second test message (722) was not received from an adjacent compute node assigned to the second group (708). Readers will note that the methods of notifying (726) a user, by each of the compute nodes (700) assigned to the first group (706), whether the second test message (722) was received as described above are for explanation and not for limitation. In fact, any manner of notifying (726) a user, by each of the compute nodes (700) assigned to the first group (706), whether the second test message (722) was received as will occur to those of skill in the art may be useful in link failure detection in a parallel computer according to embodiments of the present invention.

When a compute node assigned to the first group sends a first test message to an adjacent compute node assigned to the second group, the outbound link from the compute node assigned to the first group to the adjacent compute node assigned to the second group is tested. For further explanation of testing the outbound links from each compute node assigned to the first group to the adjacent compute nodes assigned to the second group, consider FIG. 8A that sets forth a line drawing illustrating exemplary compute nodes useful in systems capable of link failure detection in a parallel computer in accordance with embodiments of the present invention. The example of FIG. 8A includes five compute nodes (800, 802, 804, 806, 808) connected for data communications in a rectangular mesh network. The five compute nodes (800, 802, 804, 806, 808) form four pairs of adjacent compute nodes. Each pair of adjacent compute nodes in the rectangular mesh network of FIG. 8A is connected together using a pair (810) of links.

Figure 8A:
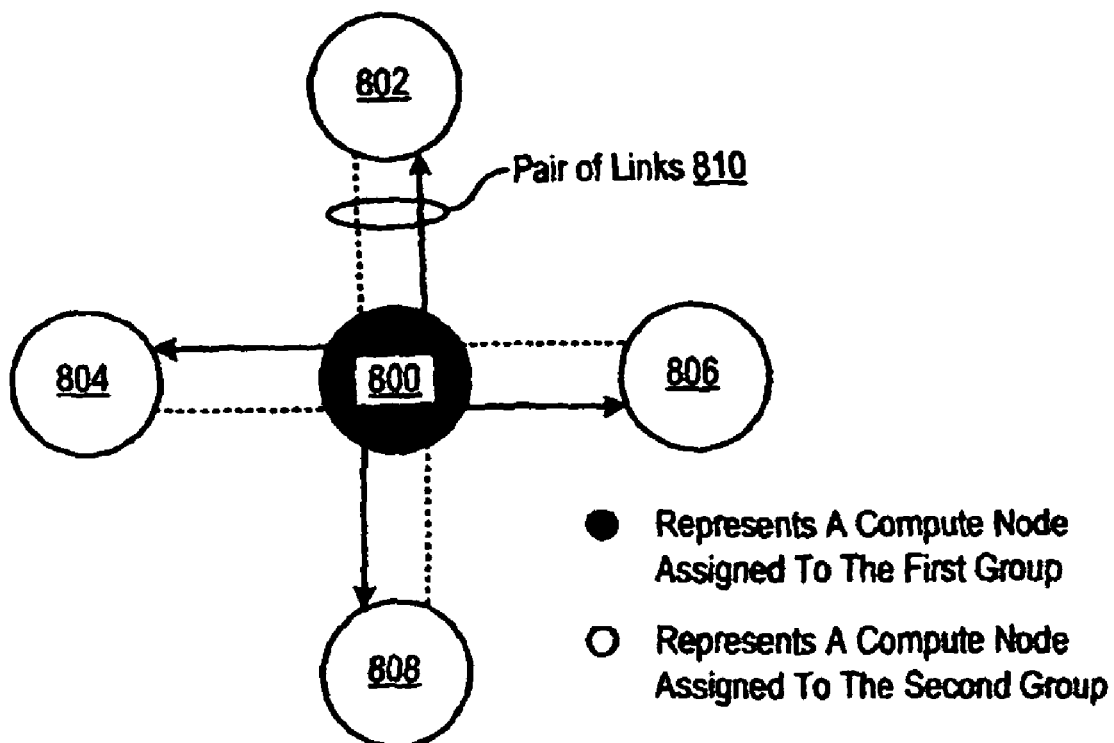
FIG. 8A sets forth a line drawing illustrating exemplary compute nodes useful in systems capable of link failure detection in a parallel computer in accordance with embodiments of the present invention.

In the example of FIG. 8A, the compute nodes (800, 802, 804, 806, 808) of the rectangular mesh network are assigned to either a first group or a second group such that adjacent compute nodes in the rectangular mesh network are assigned to different groups. In particular, the compute node (800) is assigned to a first group, while the adjacent compute nodes (802, 804, 806, 808) are assigned to a second group.

To test the outbound links from the compute node (800) to each of the adjacent compute nodes (802, 804, 806, 808) in the example of FIG. 8A, the compute node (800) assigned to the first group sends a first test message to each of the adjacent compute nodes (802, 804, 806, 808) assigned to a second group. Each of the adjacent compute nodes (802, 804, 806, 808) assigned to a second group then determines whether the first test message was received from the adjacent compute node (800) assigned to the first group and notifies a user whether the first test message was received.

When a compute node assigned to the second group sends a second test message to an adjacent compute node assigned to the first group, the outbound link from the compute node assigned to the second group to the adjacent compute node assigned to the first group is tested. For further explanation of testing the outbound links from each compute node assigned to the second group to the adjacent compute nodes assigned to the first group, consider FIG. 8B that sets forth a line drawing illustrating exemplary compute nodes useful in systems capable of link failure detection in a parallel computer in accordance with embodiments of the present invention. The example of FIG. 8B includes five compute nodes (800, 802, 804, 806, 808) connected for data communications in a rectangular mesh network. The five compute nodes (800, 802, 804, 806, 808) form four pairs of adjacent compute nodes. Each pair of adjacent compute nodes in the rectangular mesh network of FIG. 8B is connected together using a pair (810) of links.

Figure 8B:
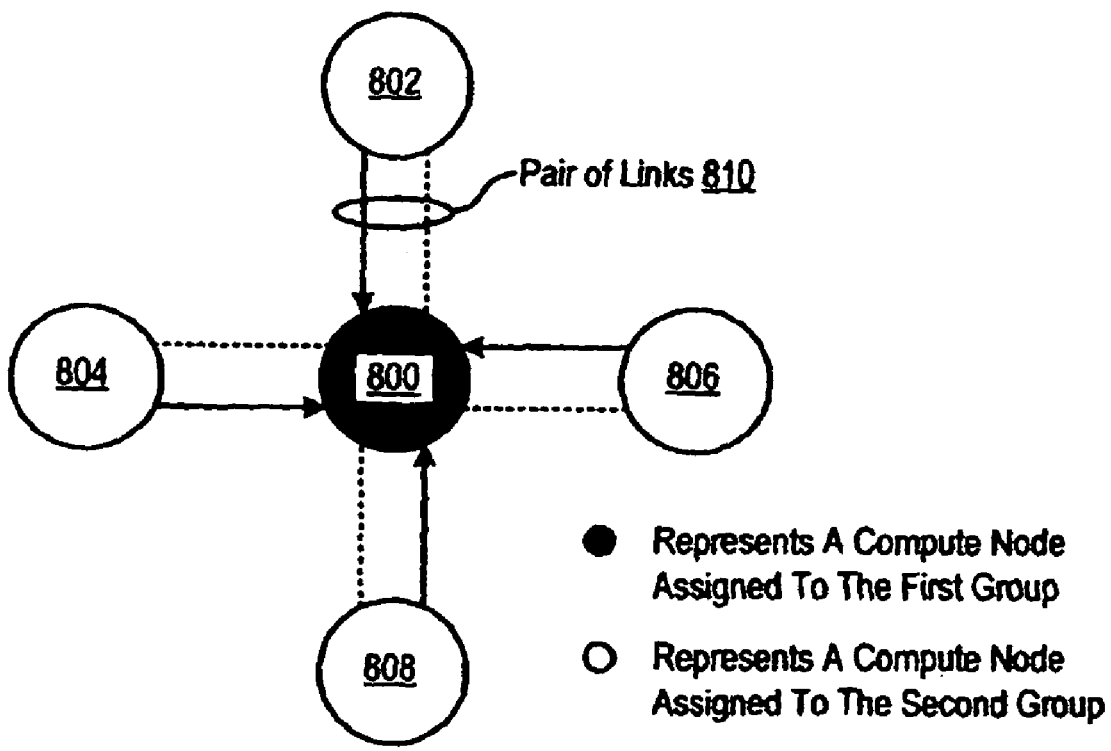
FIG. 8B sets forth a line drawing illustrating further exemplary compute nodes useful in systems capable of link failure detection in a parallel computer in accordance with embodiments of the present invention.

In the example of FIG. 8B, the compute nodes (800, 802, 804, 806, 808) of the rectangular mesh network are assigned to either a first group or a second group such that adjacent compute nodes in the rectangular mesh network are assigned to different groups. In particular, the compute node (800) is assigned to a first group, while the adjacent compute nodes (802, 804, 806, 808) are assigned to a second group.

To test the outbound links from each of the compute nodes (802, 804, 806, 808) to the adjacent compute node (800) in the example of FIG. 8B, each of the compute nodes (802, 804, 806, 808) assigned to the second group sends a second test message to the adjacent compute node (800) assigned to the first group. The compute node (800) assigned to the first group then determines whether a second test message was received from the adjacent compute nodes (802, 804, 806, 808) assigned to the second group and notifies a user whether the second test messages were received.

Readers will note that link failure detection in a parallel computer according to embodiments of the present invention takes advantage of the parallel processing capabilities of the parallel computer to notify a user of all link failures in two phases. In the first phase, all outbound links from the compute nodes assigned to the first group to adjacent compute nodes assigned to the second group are tested concurrently. A user is then notified of any link failures that were detected in the first phase. In the second phase, all outbound links from the compute nodes assigned to the second group to adjacent compute nodes assigned to the first group are tested concurrently. A user is then notified of any link failures that were detected in the second phase. Because link failure detection in a parallel computer according to embodiments of the present invention occurs concurrently tests the outbound links for all the compute nodes in a particular group, the performance of link failure detection according to embodiments of the present invention is not significantly affected by the number of compute nodes in the parallel computer. As such, the performance of link failure detection according to embodiments of the present invention is similar across parallel computers regardless of the number of compute nodes included in each parallel computer.

Exemplary embodiments of the present invention are described largely in the context of a fully functional computer system for link failure detection in a parallel computer. Readers of skill in the art will recognize, however, that the present invention also may be embodied in a computer program product disposed on computer readable media for use with any suitable data processing system. Such computer readable media may be transmission media or recordable media for machine-readable information, including magnetic media, optical media, or other suitable media. Examples of recordable media include magnetic disks in hard drives or diskettes, compact disks for optical drives, magnetic tape, and others as will occur to those of skill in the art. Examples of transmission media include telephone networks for voice communications and digital data communications networks such as, for example, Ethernets™ and networks that communicate with the Internet Protocol and the World Wide Web as well as wireless transmission media such as, for example, networks implemented according to the IEEE 802.11 family of specifications. Persons skilled in the art will immediately recognize that any computer system having suitable programming means will be capable of executing the steps of the method of the invention as embodied in a program product. Persons skilled in the art will recognize immediately that, although some of the exemplary embodiments described in this specification are oriented to software installed and executing on computer hardware, nevertheless, alternative embodiments implemented as firmware or as hardware are well within the scope of the present invention.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for link failure detection in a parallel computer, the parallel computer comprising a plurality of compute nodes connected for data communications in a rectangular mesh network, each pair of adjacent compute nodes in the rectangular mesh network connected together using a pair of links, the method further comprising:

assigning each compute node of the rectangular mesh network to either a first group or a second group such that adjacent compute nodes in the rectangular mesh network are assigned to different groups;

sending, by each of the compute nodes assigned to the first group, a first test message to each adjacent compute node assigned to the second group;

determining, by each of the compute nodes assigned to the second group, whether the first test message was received from each adjacent compute node assigned to the first group; and notifying a user, by each of the compute nodes assigned to the second group, whether the first test message was received.

2. The method of claim 1 further comprising:

sending, by each of the compute nodes assigned the second group, a second test message to each adjacent compute node assigned to the first group;

determining, by each of the compute nodes assigned to the first group, whether the second test message was received from each adjacent compute node assigned to the second group; and notifying the user, by each of the compute nodes assigned to the first group, whether the second test message was received.

3. The method of claim 1 wherein:

each compute node in the rectangular mesh network is assigned a coordinate; and assigning each compute node of the rectangular mesh network to either a first group or a second group further comprises assigning each compute node of the rectangular mesh network to either the first group or the second group in dependence upon the coordinate assigned to the compute node.

4. The method of claim 1 wherein:

each compute node in the rectangular mesh network is assigned an X-coordinate, a Y-coordinate, and a Z-coordinate; and assigning each compute node of the rectangular mesh network to either a first group or a second group further comprises:

calculating a group value for each compute node, wherein the group value for each compute node comprises modulus two of a sum of modulus two of the X-coordinate, modulus two of the Y-coordinate, and modulus two of the Z-coordinate, assigning each compute node having group value of zero to the first group, and assigning each compute node having a group value of one to the second group.

5. The method of claim 1 wherein the rectangular mesh network is a torus network.

6. The method of claim 1 wherein the plurality of compute nodes are connected for data communications through a plurality of data communications networks, at least one of the data communications networks optimized for point to point data communications, and at least one of the data communications networks optimized for collective operations.

7. A parallel computer for link failure detection, the parallel computer comprising a plurality of compute nodes connected for data communications in a rectangular mesh network, each pair of adjacent compute nodes in the rectangular mesh network connected together using a pair of links, each compute node comprising a computer processor and computer memory operatively coupled to the computer processor, the computer memory for each compute node having disposed within it computer program instructions capable of:

assigning each compute node of the rectangular mesh network to either a first group or a second group such that adjacent compute nodes in the rectangular mesh network are assigned to different groups;

sending, by each of the compute nodes assigned to the first group, a first test message to each adjacent compute node assigned to the second group;

determining, by each of the compute nodes assigned to the second group, whether the first test message was received from each adjacent compute node assigned to the first group; and notifying a user, by each of the compute nodes assigned to the second group, whether the first test message was received.

8. The parallel computer of claim 7 where the computer memory for each compute node also has disposed within it computer program instructions capable of:

sending, by each of the compute nodes assigned the second group, a second test message to each adjacent compute node assigned to the first group;

determining, by each of the compute nodes assigned to the first group, whether the second test message was received from each adjacent compute node assigned to the second group; and notifying the user, by each of the compute nodes assigned to the first group, whether the second test message was received.

9. The parallel computer of claim 7 wherein:

each compute node in the rectangular mesh network is assigned a coordinate; and assigning each compute node of the rectangular mesh network to either a first group or a second group further comprises assigning each compute node of the rectangular mesh network to either the first group or the second group in dependence upon the coordinate assigned to the compute node.

10. The parallel computer of claim 7 wherein:

each compute node in the rectangular mesh network is assigned an X-coordinate, a Y-coordinate, and a Z-coordinate; and assigning each compute node of the rectangular mesh network to either a first group or a second group further comprises:

calculating a group value for each compute node, wherein the group value for each compute node comprises modulus two of a sum of modulus two of the X-coordinate, modulus two of the Y-coordinate, and modulus two of the Z-coordinate, assigning each compute node having group value of zero to the first group, and assigning each compute node having a group value of one to the second group.

11. The parallel computer of claim 7 wherein the rectangular mesh network is a torus network.

12. The parallel computer of claim 7 wherein the plurality of compute nodes are connected for data communications through a plurality of data communications networks, at least one of the data communications networks optimized for point to point data communications, and at least one of the data communications networks optimized for collective operations.

13. A computer program product for link failure detection in a parallel computer, the parallel computer comprising a plurality of compute nodes connected for data communications in a rectangular mesh network, each pair of adjacent compute nodes in the rectangular mesh network connected together using a pair of links, the computer program product disposed upon a non-transitory computer readable storage medium, the computer program product comprising computer program instructions, for each compute node in the set of compute nodes, capable of:

assigning each compute node of the rectangular mesh network to either a first group or a second group such that adjacent compute nodes in the rectangular mesh network are assigned to different groups;

sending, by each of the compute nodes assigned to the first group, a first test message to each adjacent compute node assigned to the second group;

determining, by each of the compute nodes assigned to the second group, whether the first test message was received from each adjacent compute node assigned to the first group; and notifying a user, by each of the compute nodes assigned to the second group, whether the first test message was received.

14. The computer program product of claim 13 further comprising computer program instructions capable of:

sending, by each of the compute nodes assigned the second group, a second test message to each adjacent compute node assigned to the first group;

determining, by each of the compute nodes assigned to the first group, whether the second test message was received from each adjacent compute node assigned to the second group; and notifying the user, by each of the compute nodes assigned to the first group, whether the second test message was received.

15. The computer program product of claim 13 wherein:
each compute node in the rectangular mesh network is assigned a coordinate; and
assigning each compute node of the rectangular mesh network to either a first group or a second group further comprises assigning each compute node of the rectangular mesh network to either the first group or the second group in dependence upon the coordinate assigned to the compute node.

16. The computer program product of claim 13 wherein:
each compute node in the rectangular mesh network is assigned an X-coordinate, a Y-coordinate, and a Z-coordinate; and
assigning each compute node of the rectangular mesh network to either a first group or a second group further comprises:
calculating a group value for each compute node, wherein the group value for each compute node comprises modulus two of a sum of modulus two of the X-coordinate, modulus two of the Y-coordinate, and modulus two of the Z-coordinate,
assigning each compute node having group value of zero to the first group, and
assigning each compute node having a group value of one to the second group.

17. The computer program product of claim 13 wherein the rectangular mesh network is a torus network.

18. The computer program product of claim 13 wherein the plurality of compute nodes are connected for data communications through a plurality of data communications networks, at least one of the data communications networks optimized for point to point data communications, and at least one of the data communications networks optimized for collective operations.

* * * * *